United States Patent
Esser et al.

(10) Patent No.: US 7,210,779 B2
(45) Date of Patent: May 1, 2007

(54) DOUBLE PROGRESSIVE SPECTACLE LENS

(75) Inventors: Gregor Esser, Munich (DE); Walter Haimerl, Munich (DE); Edda Wehner, Emmering (DE); Andrea Welk, Munich (DE); Helmut Altheimer, Baisweil-Lauchdorf (DE); Martin Zimmerman, Erdweg-Kleinberghofen (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/128,302

(22) Filed: May 13, 2005

(65) Prior Publication Data

US 2006/0007392 A1 Jan. 12, 2006

Related U.S. Application Data

(63) Continuation of application No. PCT/EP03/12713, filed on Nov. 13, 2003.

(30) Foreign Application Priority Data

Nov. 14, 2002 (DE) .................. 102 53 130

(51) Int. Cl.
*G02C 7/06* (2006.01)

(52) U.S. Cl. ...................... 351/169; 351/177

(58) Field of Classification Search ................. 351/169
See application file for complete search history.

(56) References Cited

U.S. PATENT DOCUMENTS 5,926,250 A * 7/1999 Mukaiyama et al. ........ 351/168
6,149,271 A   11/2000 Menezes et al.
6,199,984 B1 * 3/2001 Menezes ...................... 351/169
6,886,938 B1 * 5/2005 Menezes ...................... 351/169

FOREIGN PATENT DOCUMENTS

| DE | 197 01 312 A1 | 7/1998 |
| EP | 0 996 023 A2 | 4/2000 |
| WO | WO 02/061496 A2 | 8/2002 |

* cited by examiner

*Primary Examiner*—Jordan M. Schwartz
(74) *Attorney, Agent, or Firm*—Crowell & Moring LLP

(57) ABSTRACT

A double-progressive spectacle lens in which the progressive action is distributed over the front and rear surfaces of the double-progressive spectacle lenses and described by the quotient Q $$Q = \mathrm{Add}_{vf}/\mathrm{Add}_{Gesamt}$$

where $\mathrm{Add}_{vf}$ represents the increase in the surface dioptric power along the principal line on the front surface between the distance area and the near area, and $\mathrm{ADD}_{Gesamt}$ represents the increase in the total dioptric power along the principal line between the distance area and the near area, and the fraction Q increases with growing distance area effect F:

$$\frac{dQ(F)}{dF} \geq 0.$$

9 Claims, 2 Drawing Sheets ptsuk # DOUBLE PROGRESSIVE SPECTACLE LENS

CROSS REFERENCE TO RELATED APPLICATIONS

This application is a continuation of international patent application no. PCT/EP2003/012713, filed Nov. 13, 2003, designating the United States of America, and published in German as WO 2004/044643 on May 27, 2004, the entire disclosure of which is incorporated herein by reference. Priority is claimed based on Federal Republic of Germany patent application no. DE 102 53 130.7, filed Nov. 14, 2002.

BACKGROUND OF THE INVENTION

The present invention relates to a double-progressive spectacle lens.

Single-progressive spectacle lenses and also double-progressive spectacle lenses are known from the prior art. For example, U.S. Pat. No. 6,089,713 (=DE 197 01 312) describes a spectacle lens having a spherical front side and multifocal rear side, and also a method for producing it. Published German patent application no. DE 33 31 757 A1 describes a progressive spectacle lens having a convex aspheric front surface and concave aspheric inside or rear surface.

However, it has been found in the case of spectacle lenses having progressive rear surfaces that in the stronger addition area the spherical front surfaces must be fashioned with more of a curve than the front surfaces in the distance area of lenses having progressive front surfaces. This is felt to be disadvantageous by the spectacle wearer both for optical and for cosmetic reasons. The reason for this resides in the geometry of the lenses: if, for example, a lens is designed with a distance area effect of +5 dpt, in the case of progressive front surfaces use is made, for example, of a front surface with a surface dioptric power of +7 dpt which rises in the near area to approximately +10 dpt if the lens is to have an addition of 3 dpt. The spherical rear surface then has a surface dioptric power of approximately −2 dpt, resulting in an effect of approximately +5 dpt in the distance area.

If, in the case of progressive rear surfaces, a spherical front surface is to be selected which is as flat as the distance area of the lens with a progressive front surface (that is to say 7 dpt), the rear surface would need to have a surface dioptric power of −2 dpt in the distance area. With progressive rear surfaces, the mean curvature needs to decrease from the distance area to the near area and not, however, to increase such as would happen with progressive front surfaces. Thus, the surface dioptric power must rise from −2 dpt by 3 dpt to +1 dpt, in order to effect an addition of 3 dpt. This form of surface configuration is termed reversal of curvature. The surface is no longer only concave, as is the case with conventional products, but has an S-shaped course in a vertical section.

However, rear surfaces with reversal of curvature exhibit specific wearing properties which can lead to problems for the spectacle wearer. One problem is the relative nearness of the rear surface to the eye when such lenses are countersunk in conventional mounts. Since the eyelashes then strike against the lens, this frequently leads to irritation. A further problem is the more frequently occurring reflections which have a disturbing effect and reduce the contrast during seeing.

In order to avoid these effects, it is possible to increase only the curvature of the front surface in the case of lenses with a progressive rear surface, but this entails lenses which are thicker and unattractive cosmetically. Again, this raises the intrinsic magnification of the lenses, the result of which is to intensify the so-called "cow-eye effect".

SUMMARY OF THE INVENTION

It is therefore an object of the invention to provide an improved double-progressive spectacle lens.

Another object of the invention is to provide a double-progressive spectacle lens which avoids the disadvantages of the prior art discussed above.

These and other objects are achieved in accordance wth the present invention by providing a double-progressive spectacle lens in which the progressive action is distributed over the front and rear surfaces of the double-progressive spectacle lenses and described by the quotient Q $$Q = \text{Add}_{vfl}/\text{Add}_{Gesamt}$$

wherein $\text{Add}_{vfl}$ represents the increase in the surface dioptric power along the principal line on the front surface between the distance area and the near area, $\text{Add}_{Gesamt}$ represents the increase in the total dioptric power along the principal line between the distance area and the near area, and the fraction Q increases with growing distance area effect F:

$$\frac{dQ(F)}{dF} \geq 0.$$

Thus, in accordance with the present invention, the progressive action of a double-progressive spectacle lens is distributed over the front and rear surfaces of the double-progressive spectacle lenses and described by the quotient Q $$Q = \text{Add}_{vfl}/\text{Add}_{Gesamt}$$

$\text{Add}_{vfl}$ representing the increase in the surface dioptric power along the principal line on the front surface between the distance area and the near area, and $\text{Add}_{Gesamt}$ representing the increase in the total dioptric power along the principal line between the distance area and the near area, and the fraction Q rising with growing distance area effect F:

$$\frac{dQ(F)}{dF} \geq 0.$$

There are many reasons in favour of not putting the entire addition onto the rear surface: in order for reflections which are seen by a viewer who is standing opposite the spectacle wearer to be kept small in physical terms, the front surface should not be fashioned too flat. The point is that otherwise the entire spectacle lens "flashes" in the reflection given unfavourable illumination and movement of the head, and this irritates the viewer. If the front surface is progressively fashioned, more aesthetic reflections are thereby produced because at least the lower part of the lens has a higher curvature. A further reason is the poor ability to fabricate progressive rear surfaces in the case of strong negative effects.

Because of the dynamics of the necessarily small instruments for grinding and polishing, it is more advantageous to have only a small fraction of the addition on the rear surface. It has therefore turned out to be advantageous not to put the entire addition on the rear surface, that is to say with the exception of extreme negative effects.

It has now been found that the negative effects of lenses with progressive rear surfaces can be avoided when a substantial fraction of the addition is transferred in the addition region on to the front surface. It has also been found that it is more desirable in the subtraction area to implement a certain fraction of the addition on the rear surface.

The following definitions are introduced in order to describe the distribution of the increase in dioptric power on the front and rear surfaces.

$Add_{vfl}$=increase in the surface dioptric power along the principal line on the front surface between the distance area and the near area.

$Add_{Gesamt}$=increase in the total dioptric power along the principal line between the distance area and the near area as caused by the dioptric effect both of the front and of the rear surfaces.

The fraction of the addition according to the front surface is yielded by a dimensionless characteristic number, the quotient Q $Q=Add_{vfl}/Add_{Gesamt}$.

Various cases follow from this definition:

In the case of a conventional progressive lens, in which the progressive surface lies at the front and the rear surface is an (a-)sphere or an (a-)torus, the rear surface makes no contribution to the addition. Consequently, $Add_{vfl}=Add_{Gesamt}$ and the quotient Q=1.

In the case of a progressive lens in which the progressive surface is located at the back, and the front surface is an (A-)sphere or (A-)torus, by contrast, the front surface makes no contribution to the addition. Consequently, $Add_{vfl}$=0 dpt, and the quotient Q=0 given finite total addition $Add_{Gesamt}$.

In the case of a progressive lens with two progressive surfaces, the value Q need not necessarily be between 0 and 1. Q can have a value of <0, specifically whenever the front surface has a degressive effect. The rear surface must then have an addition which is greater than the prescribed value. By contrast, Q can also be greater than 1. This is the case wherever the front surface has an addition which is greater than that prescribed. It is then necessary for the excessively strong increase in the action of the front surface to be compensated by a decrease in the effect of the rear surface.

Furthermore, the fraction Q increases in accordance with a linear function of the distance area effect F:

$Q(F)=Q_0+Q_1 \cdot F$ where $Q_0$=0.5 and $Q_1$=0.04/dpt.

Furthermore, the fraction Q can increase in accordance with an approximately linear function of the spherical distance area effect F:

$Q(F)=Q_0 \pm dQ_0+(Q_1 \pm dQ_1) \cdot F$ where $Q_0$=0.5 and $Q_1$=0.04/dpt and $dQ_0$=0.2 and $dQ_1$=0.02/dpt.

In accordance with the invention, it is now more advantageous for a larger fraction of the progressive effect to be put onto the rear surface in the distance area of negative distance effects. It can even be desirable to select Q to be negative in the stronger subtraction area.

As already mentioned, it is more advantageous in the addition area to have a high fraction of the addition on the front surface. It can therefore even prove to be advantageous to select Q to be greater than 1 in the stronger addition area.

The result of these findings is that it is necessary to configure the addition fraction Q as a function of effect. This is possible, for example, using the following model:

TABLE 1

Dependence of the quotient Q on the effect and the tolerances

| Spherical Effect | Nominal value Q | Minimum Q | Maximum Q |
|---|---|---|---|
| ≤−10 dpt | 0.2 | 0 | 0.4 |
| −5 dpt | 0.3 | 0.1 | 0.5 |
| 0 dpt | 0.5 | 0.3 | 0.7 |
| +5 dpt | 0.7 | 0.5 | 0.9 |
| ≥+10 dpt | 0.8 | 0.6 | 1 |

It is also possible to select another transition, specifically that described in Table 2.

TABLE 2

Dependence of the quotient Q on the effect and the tolerances

| Spherical Effect | Nominal value Q | Minimum Q | Maximum Q |
|---|---|---|---|
| ≤−10 dpt | 0.1 | −0.1 | 0.3 |
| −5 dpt | 0.3 | 0.1 | 0.5 |
| 0 dpt | 0.5 | 0.3 | 0.7 |
| +5 dpt | 0.7 | 0.5 | 0.9 |
| ≥+10 dpt | 0.9 | 0.7 | 1.1 |

BRIEF DESCRIPTION OF THE DRAWINGS

The invention will be described in further detail hereinafter with reference to illustrative preferred embodiments shown in the accompanying drawing figures, which are set forth merely as examples and are not intended to limit the scope of the invention. In the drawings.

DESCRIPTION OF PREFERRED EMBODIMENTS

Figure 1:
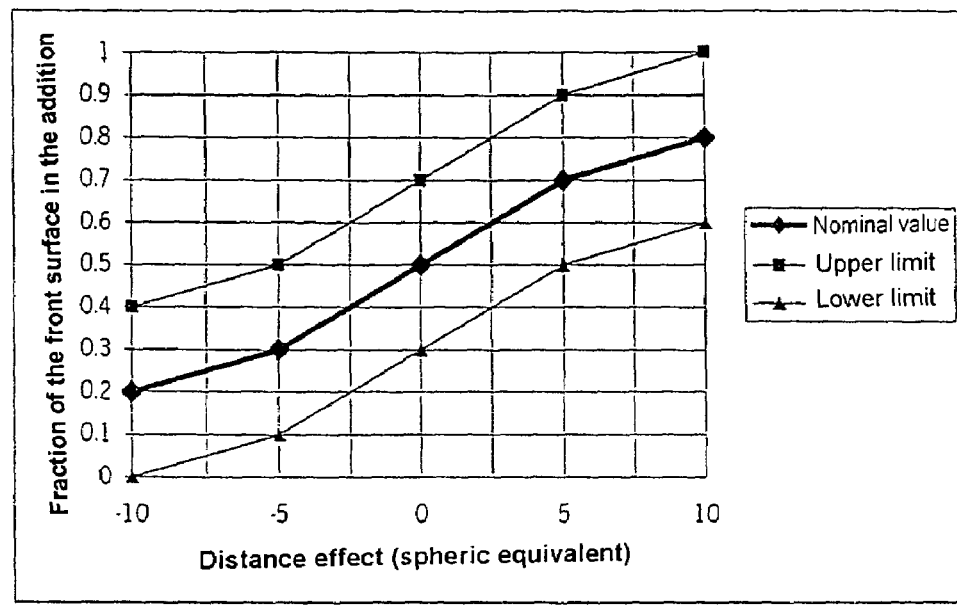
FIG. 1 is a diagram showing the dependence of the fraction (Q) of the front surface in the addition on the distance effect.
Figure 2:
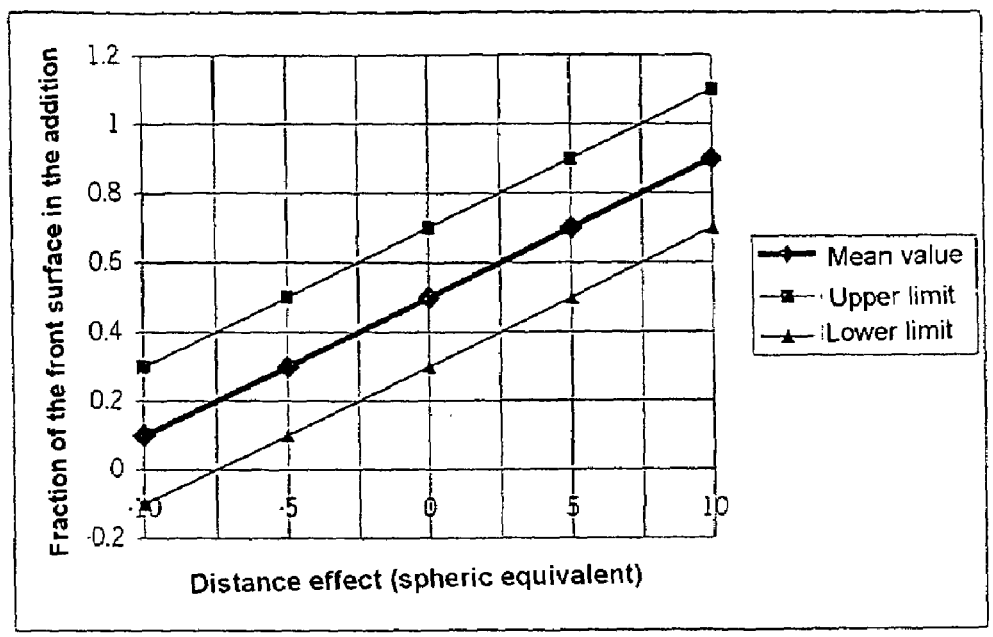
FIG. 2 is a diagram showing the dependence of the fraction (Q) of the front surface in the addition on the distance effect.

The rise in the curve is clearly to be seen from FIG. 1, the rise being slightly flattened in the extreme reaches of the effect. The graphical illustration of the tabulated values of Table 2 is given in FIG. 2. A purely linear rise is clearly to be seen, the rise not being flattened in the extreme regions of the effect. In both figures, the scope of protection extends like a tube over the region between the upper and lower limits.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A set of double-progressive spectacle lenses in which the progressive action is distributed over the front and rear surfaces of the double-progressive spectacle lenses and described by $Q = \text{Add}_{vfl}/\text{Add}_{Gesamt}$ wherein $\text{Add}_{vfl}$ represents the increase in the surface dioptric power along the principal line on the front surface between the distance-vision area and the near-vision area, $\text{Add}_{Gesamt}$ represents an increase in total dioptric power along the principal line between the distance-vision area and the near-vision area among lenses within the set, and Q increases with an increasing power F in the distance-vision area such that:

$$\frac{dQ(F)}{dF} \geq 0.$$

2. A set of double-progressive spectacle lenses according to claim 1, wherein Q increases in accordance with a linear function of spherical distance-vision area power F:

$Q(F) = Q_0 + Q_1 \cdot F$ where $Q_0 = 0.5$ and $Q_1 = 0.04$/dpt.

3. A set of double-progressive spectacle lenses according to claim 1, wherein Q increases in accordance with an approximately linear function of spherical distance-vision area power F:

$Q(F) = Q_0 \pm dQ_0 + (Q_1 \pm dQ_1) \cdot F,$ where $Q_0 = 0.5$ and $Q_1 = 0.04$/dpt, and where $dQ_0 = 0.2$ and $Q_1 = 0.02$/dpt.

4. A set of double-progressive spectacle lenses according to claim 1, wherein Q increases in accordance with an approximately linear function of spherical distance-vision area power F:

$Q(F) = Q_0 \pm dQ_0 \pm (Q_1 \pm dQ_1) \cdot F,$ where $Q_0 = 0.5$ and $Q_1 = 0.04$/dpt, and where $dQ_0 = 0.1$ and $Q_1 = 0.01$/dpt.

5. A set of double-progressive spectacle lenses according to claim 1, wherein Q lies within the following values:

| Spherical Effect | Nominal value Q | Minimum Q | Maximum Q |
| --- | --- | --- | --- |
| $\leq -10$ dpt | 0.2 | 0 | 0.4 |
| $-5$ dpt | 0.3 | 0.1 | 0.5 |
| 0 dpt | 0.5 | 0.3 | 0.7 |
| $+5$ dpt | 0.7 | 0.5 | 0.9 |
| $\geq +10$ dpt | 0.8 | 0.6 | 1 | as a function of the distance-vision area power.

6. A set of double-progressive spectacle lenses according to claim 1, wherein the change in Q with the distance-vision area power is greater than 0.01/dpt for powers less than 5 dpt in absolute value.

7. A set of double-progressive spectacle lenses according to claim 1, wherein the change in Q with the distance-vision area power is greater than 0.01/dpt for powers greater than 5 dpt in absolute value.

8. A set of double-progressive spectacle lenses according to claim 1, wherein Q<0 or >1.

9. Method for fabricating a set of double-progressive spectacle lenses, the method comprising a step of distributing the progressive power of the spectacle lenses over the front and rear surface of the spectacle lenses such that among lenses within the set the quotient Q:

$Q = \text{Add}_{vfl}/\text{Add}_{Gesamt}$ increases with increasing power F in the distance-vision area:

$$\frac{dQ(F)}{dF} > 0$$

wherein $\text{Add}_{vfl}$ represents the increase in the surface dioptric power along the principal line on the front surface between the distance-vision area and the near-vision area, and $\text{Add}_{Gesamt}$ represents the increase in the total dioptric power along the principal line between the distance-vision area and the near-vision area.

* * * * *